(12) United States Patent
Usami

(10) Patent No.: US 6,175,886 B1
(45) Date of Patent: Jan. 16, 2001

(54) SEMICONDUCTOR INTEGRATED CIRCUIT WITH LOW-POWER BUS STRUCTURE AND SYSTEM FOR COMPOSING LOW-POWER BUS STRUCTURE

(75) Inventor: Kimiyoshi Usami, Kanagawa-ken (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/143,544

(22) Filed: Aug. 28, 1998

(30) Foreign Application Priority Data

Aug. 28, 1997 (JP) .................................................. 9-232965

(51) Int. Cl.[7] ..................................................... G06F 13/00
(52) U.S. Cl. .......................... 710/100; 710/126; 710/129; 710/131
(58) Field of Search ..................................... 710/100, 126, 710/129, 131

(56) References Cited

U.S. PATENT DOCUMENTS 4,604,743 * 8/1986 Alexandru ............................. 370/85
4,922,409 * 5/1990 Schoellkopf et al. .
5,375,097 * 12/1994 Reddy et al. .................... 365/230.06
5,917,336 * 6/1999 Smith et al. .......................... 326/30

* cited by examiner

Primary Examiner—Ario Etienne
(74) Attorney, Agent, or Firm—Foley & Lardner

(57) ABSTRACT

A bus (9) is structured to reduce Dower consumption. The bus (9) is used to transfer data among functional blocks (1, 3, 5, 7) formed on an LSI chip. The bus is divided into subsections (9a, 9b, 9c). A pair of the functional blocks (1, 7) whose frequency of mutual data transfer is high is connected to the same subsection (9b). Connectors (29, 31) are inserted between the subsections so that the subsections may optionally electrically be connected to and disconnected from each other. When data is transferred between the functional blocks whose frequency of mutual data transfer is high, the subsection to which the functional blocks in question are connected is electrically disconnected by the connectors from the other subsections.

9 Claims, 11 Drawing Sheets

FIG. 13

| DATA TRANSFER | CONT 9 | CONT 10 | CONT 11 | CONT 12 |
|---|---|---|---|---|
| FUNCTIONAL BLOCKS 83→79 | ACTIVE | INACTIVE | INACTIVE | INACTIVE |
| FUNCTIONAL BLOCKS 83→85 | INACTIVE | INACTIVE | INACTIVE | INACTIVE |
| FUNCTIONAL BLOCKS 83→81 | ACTIVE | ACTIVE | ACTIVE | INACTIVE |
| FUNCTIONAL BLOCKS 79→83 | INACTIVE | INACTIVE | INACTIVE | INACTIVE |
| FUNCTIONAL BLOCKS 79→85 | INACTIVE | INACTIVE | ACTIVE | INACTIVE |
| FUNCTIONAL BLOCKS 79→81 | INACTIVE | ACTIVE | INACTIVE | INACTIVE |
| FUNCTIONAL BLOCKS 85→83 | INACTIVE | INACTIVE | ACTIVE | INACTIVE |
| FUNCTIONAL BLOCKS 85→79 | INACTIVE | ACTIVE | INACTIVE | INACTIVE |
| FUNCTIONAL BLOCKS 85→81 | INACTIVE | INACTIVE | INACTIVE | ACTIVE |
| FUNCTIONAL BLOCKS 81→83 | INACTIVE | INACTIVE | INACTIVE | ACTIVE |
| FUNCTIONAL BLOCKS 81→79 | INACTIVE | INACTIVE | INACTIVE | ACTIVE |
| FUNCTIONAL BLOCKS 81→85 | INACTIVE | INACTIVE | INACTIVE | ACTIVE |

SEMICONDUCTOR INTEGRATED CIRCUIT WITH LOW-POWER BUS STRUCTURE AND SYSTEM FOR COMPOSING LOW-POWER BUS STRUCTURE

BACKGROUND OF THE INVENTION

1. Field of the Invention

The present invention relates to an LSI (large scale integrated circuit) chip capable of operating on low power, and particularly, to a low-power bus structure for LSI chips and a system for composing such a low-power bus structure.

2. Description of the Prior Art

An LSI chip has a core containing functional blocks that transfer data among them through a bus.

FIG. 1 shows a bus structure according to a prior art to connect functional blocks to one another. A bus 1009 is shared by the functional blocks 1001, 1003, 1005, and 1007. The functional blocks connect their output signals to the bus 1009 through respective bus drivers 1011, 1013, 1015, and 1017 and receive input signals from the bus 1009 through respective buffers 1019, 1021, 1023, and 1025. For example, the functional block 1001 connects its output signal to the bus 1009 through the bus driver 1011 and receives an input signal from the bus 1009 through the buffer 1019.

Control signals CONT100, CONT200, CONT300, and CONT400 control the bus drivers 1011 to 1017, respectively. In response to these control signals, the bus drivers determine connection states between the bus 1009 and the corresponding functional blocks. For example, the control signal CONT100 is activated to connect the output of the functional block 1001 to the bus 1009 and is inactivated to disconnect the same from the bus 1009. The other bus drivers work similarly.

Since the bus 1009 is shared, only a function block is allowed to send data, and during this operation, the other functional blocks are prohibited from sending data to the bus 1009. To achieve this, a bus arbitrator 1027 is arranged to control the control signals CONT100 to CONT400 so that only one of them is activated. For example, when the functional block 1001 transfers data to the functional block 1007, only the control signal CONT100 is activated and the other control signals are inactivated so that only the output of the functional block 1001 is transferred to the functional block 1007 through the bus driver 1011, bus 1009, and buffer 1025 as indicated with an arrow A.

This bus structure has a problem of large power consumption. When data is transferred between two of the functional blocks, the whole parasitic capacitance of the bus 1009 is charged and discharged. If the parasitic capacitance is large, it consumes large power. The power consumption of a CMOS LSI is mostly dynamic and is caused by the charging and discharging of parasitic capacitance. The parasitic capacitance of a bus increases as the bus becomes longer and as the number of bus drivers and buffers connected to the bus becomes larger. Recent improvements in the performance of LSIs are coming with increasing the bus width in LSIs, i.e., the power consumption thereof. Portable information equipment that works on batteries is rapidly spreading. It is essential for such equipment to elongate battery life. To extend battery life, it is strongly required to lower the power consumption of LSI chips installed in the portable information equipment.

SUMMARY OF THE INVENTION

An object of the present invention is to provide a low-power bus structure capable of reducing power consumption.

In order to accomplish the object, the present invention provides a bus structure shown in FIG. 2. Functional blocks 1, 3, 5, and 7 are arranged on an LSI chip and are connected to a bus 9, which transfers data among the functional blocks. The bus 9 is divided into subsections 9a, 9b, and 9c. A pair of the functional blocks, for example, 1 and 7 that frequently transfer data between them is connected to the same subsection, for example, 9b. The subsections are provided with bidirectional bus drivers 29 and 31 to selectively electrically connect and disconnect the subsections.

If the frequency of mutual data transfer is high between a give pair of the functional blocks, the present invention transfers data between such functional data blocks after electrically disconnecting the subsection to which these functional blocks are connected from the other subsections with the use of the bidirectional bus drivers. As a result, only part of the parasitic capacitance of the whole bus is charged and discharged at this time. Compared with the prior art that always charges and discharges the entire parasitic capacitance of the bus, the present invention is capable of reducing the parasitic capacitance that is charged and discharged actually, to decrease total power consumption.

BRIEF DESCRIPTION OF THE DRAWINGS

FIG. 13 is a table showing the logic of control signals for bidirectional bus drivers of FIG. 12;

DETAILED DESCRIPTION OF THE EMBODIMENTS

Figure 2:
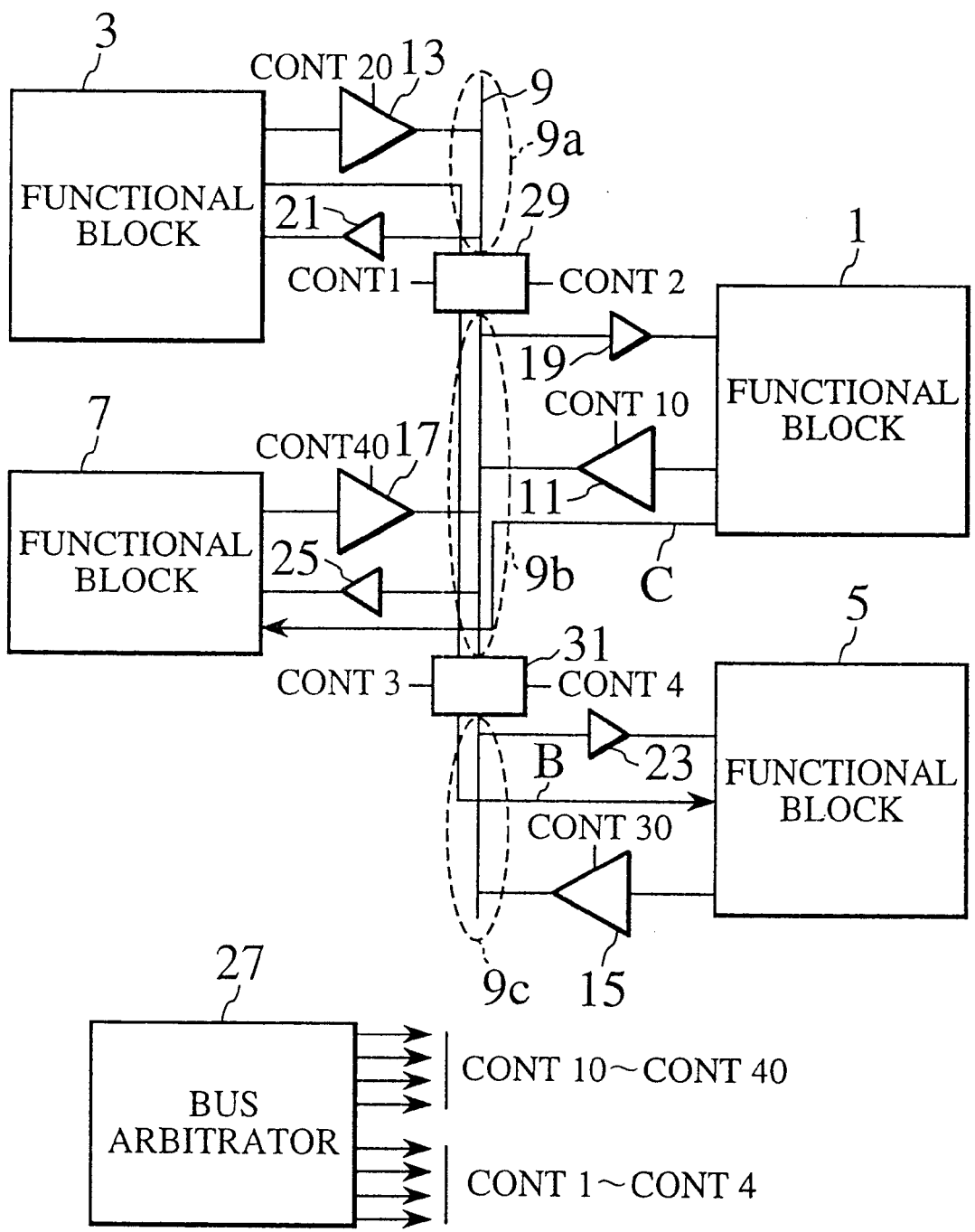
FIG. 2 is a model showing a bus structure according to a first embodiment of the present invention.

Various embodiments of the present invention will be described with reference to the accompanying drawings. FIG. 2 is a model showing a bus structure according to a first embodiment of the present invention. This shows a core of a semiconductor integrated circuit formed on an LSI chip excluding an I/O section. The core has functional blocks containing a CPU core, memory such as SRAM, DRAM, and ROM, glue logic, interrupt controller, DMA controller, MPEG decoder, serial I/O, parallel I/O of existing or new designing. If the LSI chip is a microprocessor or a DSP, the functional blocks may contain an integer operation unit, a floating-point unit, bus control unit, instruction fetch unit, branch control unit, register file, and cache memory.

The functional blocks 1, 3, 5, and 7 share a bus 9. Output signals from the functional blocks are connected to the bus 9 through respective bus drivers 11, 13, 15, and 17. Input signals from the bus 9 are connected to the functional blocks through respective buffers 19, 21, 23, and 25. For example, the functional block 1 provides an output signal to the bus 9 through the bus driver 11 and receives an input signal from the bus 9 through the buffer 19.

Control signals CONT10, CONT20, CONT30, and CONT40 control the bus drivers 11, 13, 15, and 17, respectively. In response to these control signals, the bus drivers determine connection states between the bus 9 and the corresponding functional blocks. For example, the control signal CONT10 is activated to connect the output of the functional block 1 to the bus 9 and is inactivated to disconnect the output of the functional block 1 from the bus 9. Like operation is applicable to the other bus drivers.

Since the bus 9 is shared by the functional blocks, only a functional block is allowed to send data and during this operation, the other functional blocks are prohibited from connecting their outputs to the bus 9. To realize this, a bus arbitrator 27 controls the control signals CONT10 to CONT40 so that only one of them is activated.

These operations are common to the present invention and the prior art. What is different from the prior art is that the present invention divides the bus 9 into subsections (in this embodiment, subsections 9a, 9b, and 9c) and connects the adjacent subsections to each other through a bidirectional bus driver (this example employs bidirectional bus drivers 29 and 31). These characteristics will be explained in detail.

The bus 9 is divided into the subsections 9a, 9b, and 9c with the subsections 9a and 9b being connected to each other through the bidirectional bus driver 29 and the subsections 9b and 9c through the bidirectional bus driver 31.

Figure 3:
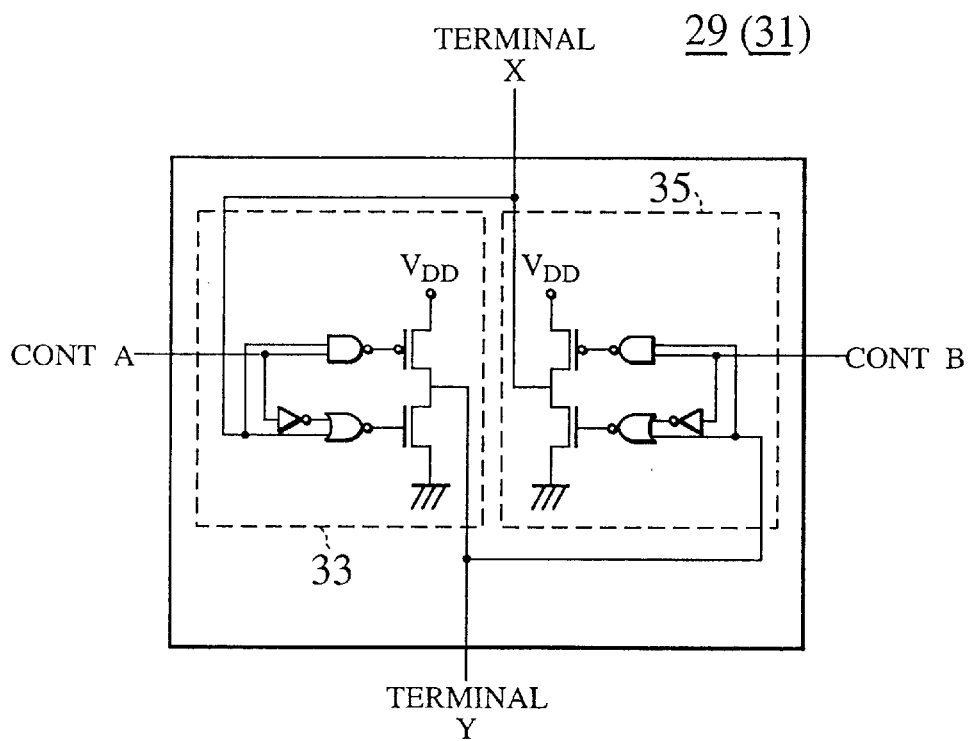
FIG. 3 shows a bidirectional bus driver shown in FIG. 2.

Each of the bus drivers 29 and 31 is controlled by two control signals that are independent of each other. More precisely, the bus driver 29 is controlled by control signals CONT1 and CONT2, and the bus driver 31 is controlled by control signals CONT3 and CONT4. FIG. 3 shows an example of a circuit that forms any one of the bus drivers 29 and 31. The circuit consists of tri-state buffers 33 and 35 that are cross-coupled with each other and are controlled by control signals CONTA and CONTB that are independent of each other. Generally, the tri-state buffer has an input terminal, an output terminal, and a control terminal. It usually receives data from the input terminal and outputs the data as it is through the output terminal. Only when a specific value is supplied to the control terminal, the tri-state buffer sets the output terminal to a high-impedance state. In this example, the tri-state buffer 33 uses a terminal X as the input terminal and a terminal Y as the output terminal and receives the control signal CONTA through the control terminal. On the other hand, the tri-state buffer 35 uses the terminal Y as the input terminal and the terminal X as the output terminal and receives the control signal CONTB through the control terminal. As a result, the bidirectional bus driver of FIG. 3 transmits data from the terminal X to the terminal Y if the control signal CONTA is activated and the control signal CONTB inactivated. If the control signal CONTA is inactivated and the control signal CONTB activated, the bidirectional bus driver transmits data from the terminal Y to the terminal X. A controller for controlling the control signals CONTA and CONTB may be an exclusive one, or the bus arbitrator 27 for controlling the control signals CONT10 to CONT40 may also control the control signals CONTA and CONTB. In this embodiment, the bus arbitrator 27 controls the control signals CONTA and CONTB.

Figure 4:
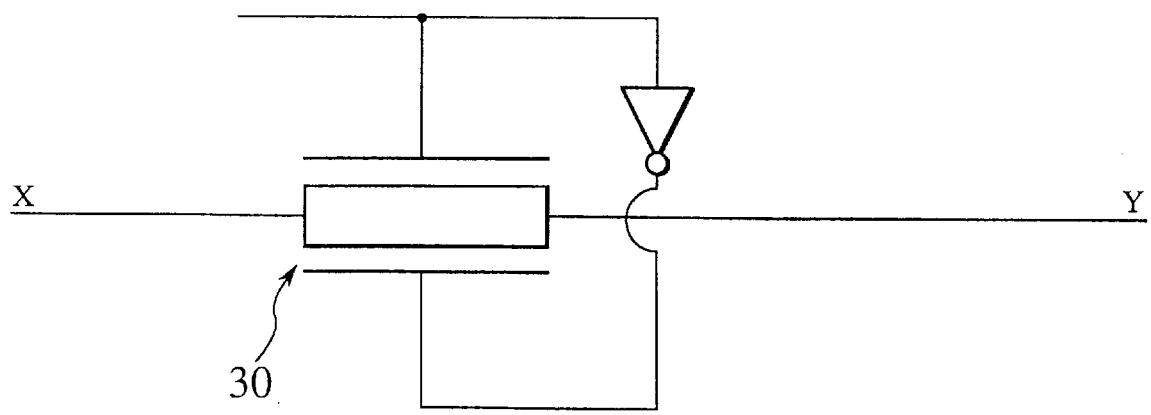
FIG. 4 shows a driver replaceable with the bidirectional bus driver of FIG. 3.

If each of the bidirectional bus drivers 29 and 31 is made of the circuit of FIG. 3, the tri-state buffers 33 and 35 provide driving power to enhance the driving power of the bus 9. The tri-state buffers 33 and 35, however, need a certain space, which is not ignorable, on the bus. In addition, the two control signals CONTA and CONTB complicate control sequences. If a simpler structure is needed, a CMOS transfer gate 30 of FIG. 4 will replace the tri-state buffer. The CMOS transfer gate 30 requires only a control signal CONTC to activate both for data transfer from a terminal X to a terminal Y and data transfer from the terminal Y to the terminal X.

A method of controlling the control signals CONT10 to CONT40 and CONT1 to CONT4 according to the present invention will be explained with reference to FIG. 2.

To transfer data from the functional block 3 to the functional block 5 as indicated with an arrow B, the control signals CONT20, CONT1, and CONT3 are activated, and the control signals CONT10, CONT30, CONT40, CONT2, and CONT4 are inactivated. As a result, an output signal from the functional block 3 is connected to the bus 9 through the bus driver 13, and the bidirectional bus drivers 29 and 31 transfer the data from the functional block 3 to the functional block 5. Namely, the output of the functional block 3 is passed through the bus driver 13, subsection 9a, bidirectional bus driver 29, subsection 9b, bidirectional bus driver 31, subsection 9c, and buffer 23 and to the functional block 5. In this case, all of the subsections 9a to 9c are charged and discharged.

To transfer data from the functional block 1 to the functional block 7 as indicated with an arrow C, only the control signal CONT10 is activated, and the other control signals CONT20 to CONT40 and CONT1 to CONT4 are inactivated. This results in connecting an output signal from the functional block 1 to the bus 9 through the bus driver 11. The bidirectional bus drivers 29 and 31 transfer no data in any directions. Namely, the subsections 9a and 9b are electrically disconnected from each other, and the subsections 9b and 9c are electrically disconnected from each other. As a result, the output of the functional block 1 is passed through the bus driver 11, subsection 9b, and buffer 25 and to the functional block 7. Since the subsection 9b is electrically disconnected from the subsections 9a and 9c, only the subsection 9b is charged and discharged in the bus 9.

Reduction in power consumption according to the embodiment will be explained. In case of transferring data from the functional block 1 to the functional block 7, only the subsection 9b is charged and discharged, and power consumption is proportional to the parasitic capacitance of the subsection 9b. The subsection 9b is a part of the bus 9, and naturally, the parasitic capacitance of the subsection 9b is smaller than that of the bus 9. Accordingly, power consumption to transfer data from the functional block 1 to the functional block 7 is smaller than that of the prior art.

Great reduction in power consumption according to the embodiment will be explained. The frequencies of mutual data transfer among the functional blocks vary. For example, the frequency of mutual data transfer between the functional blocks 1 and 7 may be high, and that between the functional blocks 3 and 5 may be low. If there are variations in the frequencies of mutual data transfer, the present invention is capable of greatly reducing power consumption. This will be explained with reference to a simple example.

Figure 1:
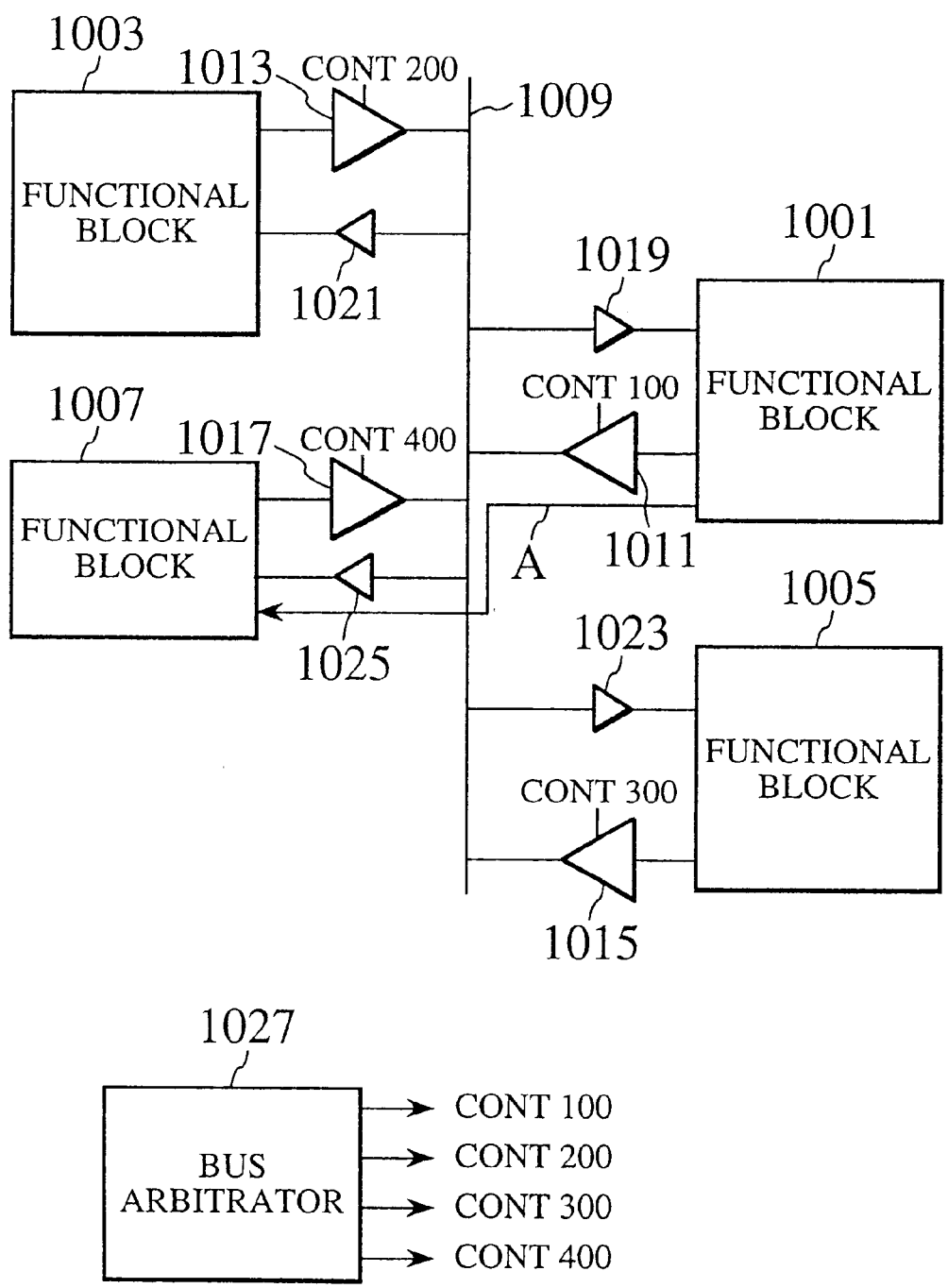
FIG. 1 is a model showing a bus structure according to a prior art for connecting functional blocks to one another.

To simplify the explanation, data transfer operations between the functional blocks 1 and 7 and between the functional blocks 3 and 5 will be considered. An assumption is made that, among 100 transfer operations, 70 will occur between the functional blocks 1 and 7 and the remaining 30 between the functional blocks 3 and 5. It is assumed that parasitic capacitance to be charged and discharged due to data transfer between the functional blocks 3 and 5 is substantially the same as that of the prior art, and that due to data transfer between the functional blocks 1 and 7 is a third of that of the prior art. It is also assumed that the bus structure of the prior art of FIG. 1 consumes one watt of power.

The power consumption of a single transfer operation between the functional blocks 1 and 7 is w1, and that between the functional blocks 3 and 5 is w2. Then, w1=0.33 watts, and w2=1 watt. The power consumption W of the bus structure of the embodiment of FIG. 2 is an average of the transfer operations:

$$W = w1 \times (70/100) + w2 \times (30/100)$$
$$= 0.33 \times (70/100) + 1 \times (30/100)$$
$$= 0.53 \text{ watts}$$

This calculation indicates that the bus structure of the embodiment reduces power consumption to 53% of the prior art.

In this way, the embodiment connects functional blocks whose frequency of mutual data transfer is high to the same subsection and electrically disconnects this subsection from the others when transferring data between the functional blocks in question. This results in reducing parasitic capacitance to be charged and discharged, thereby lowering power consumption.

Figure 5:
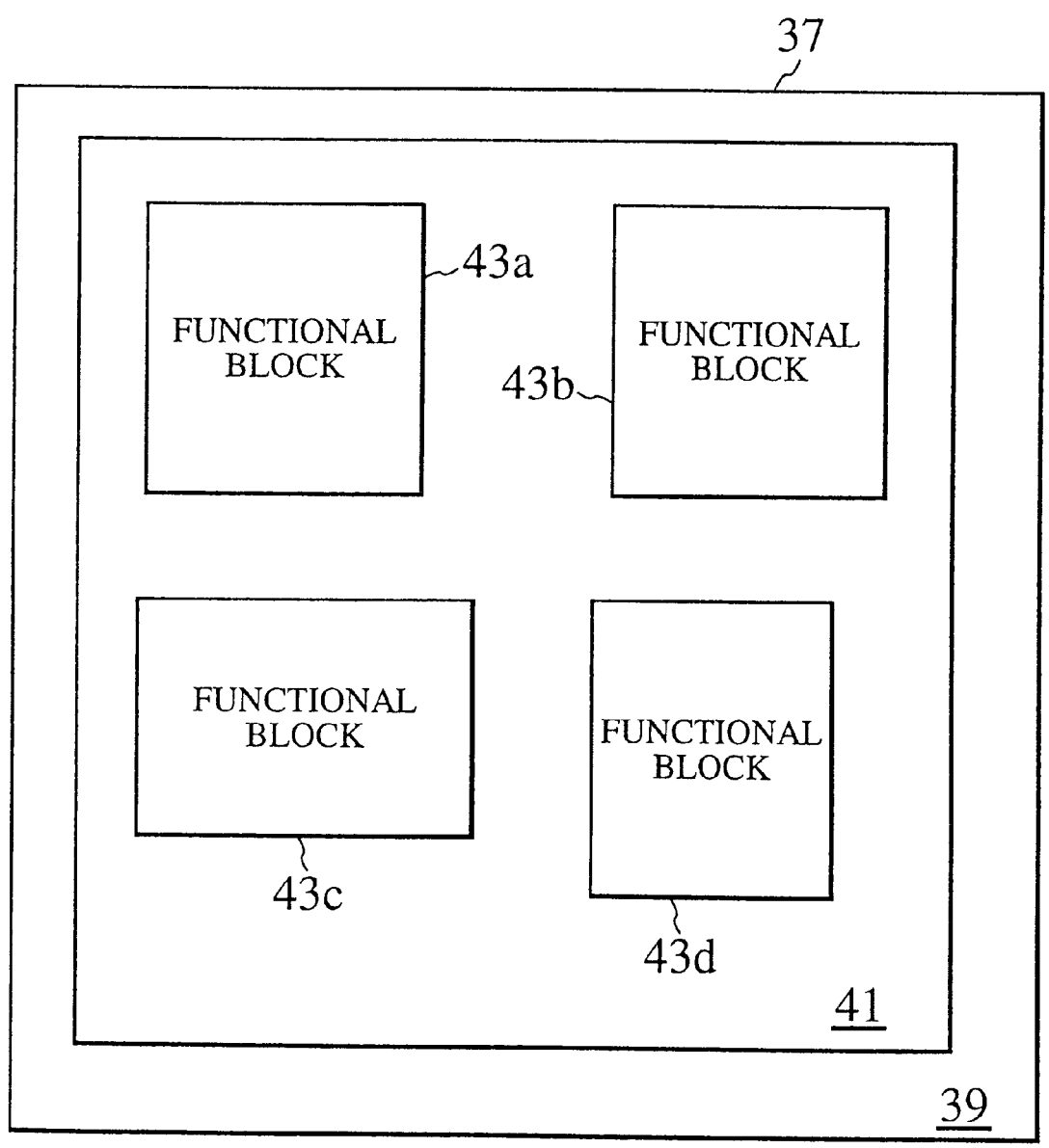
FIG. 5 is a model showing an LSI chip according to a second embodiment of the present invention.

FIG. 5 is a model showing an LSI chip according to a second embodiment of the present invention. The LSI chip 37 consists of an I/O section 39 and a core 41 that includes functional blocks 43a, 43b, 43c, and 43d. These functional blocks correspond to those of the first embodiment. The second embodiment applies the bus structure of the first embodiment to the inside of each of the functional blocks.

Figure 6:
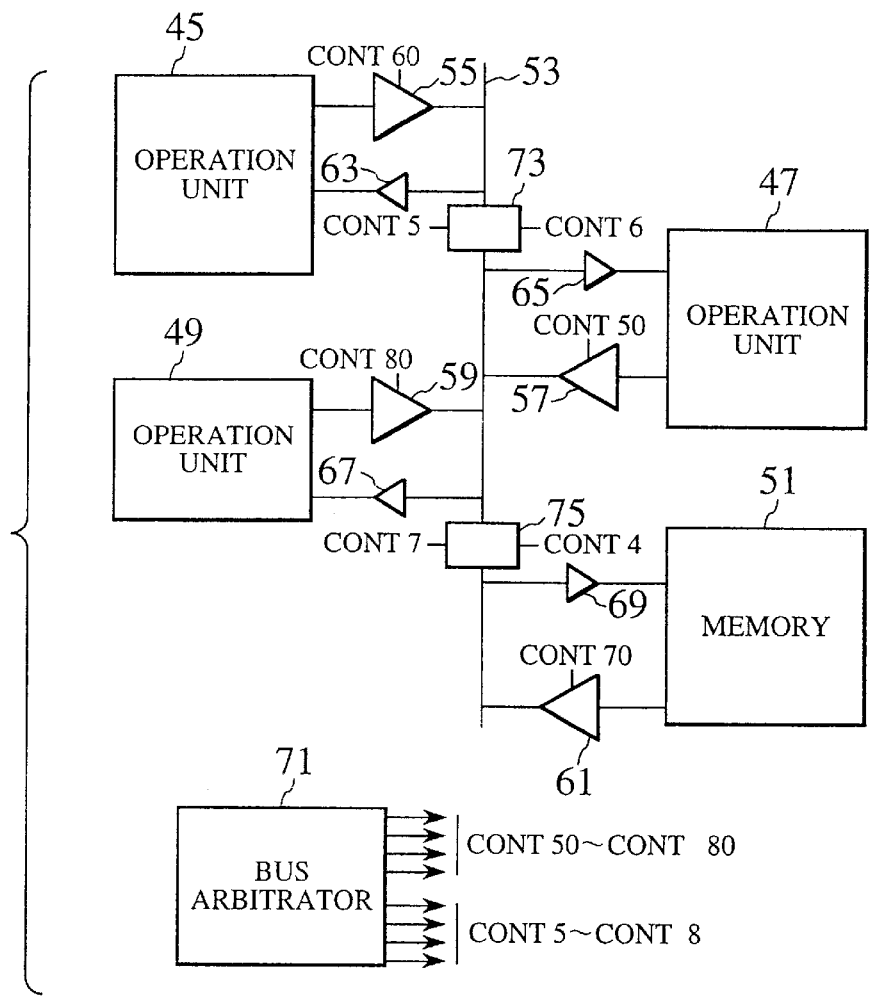
FIG. 6 is a model showing a bus structure arranged inside each functional block of FIG. 5.

FIG. 6 is a model showing the bus structure of the inside of any one of the functional blocks of FIG. 5. The functional block contains operation units 45, 47, and 49, a memory 51, bidirectional bus drivers 73 and 75, a bus arbitrator 71, bus drivers 55, 57, 59, and 61, and buffers 63, 65, 67, and 69 that are connected in a manner similar to the first embodiment.

A method of controlling the bus structure of FIG. 6 is the same as that of the first embodiment if replacing the functional blocks of FIG. 2 with the operation units and memory of FIG. 6, and therefore, will not be explained again.

Figure 7:
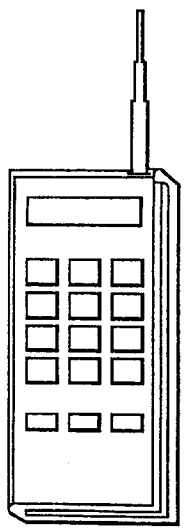
FIG. 7 shows a portable information device to which the bus structure of the present invention is effectively applicable.

The first and second embodiments realize a bus structure that reduces power consumption. Any LSI chip employing this bus structure realizes low power consumption. In particular, the bus structure of the present invention is effective when applied to an LSI chip that is installed in a portable information unit of FIG. 7. The bus structure of the present invention is also applicable to CPUs, one-chip microprocessors, control chips, and any other system chips for portable information equipment such as portable personal computers, PDAs (personal digital assistance units), cellular phones, pagers, and PHSs (personal handy systems), to reduce power consumption and elongate battery life.

Figure 8:
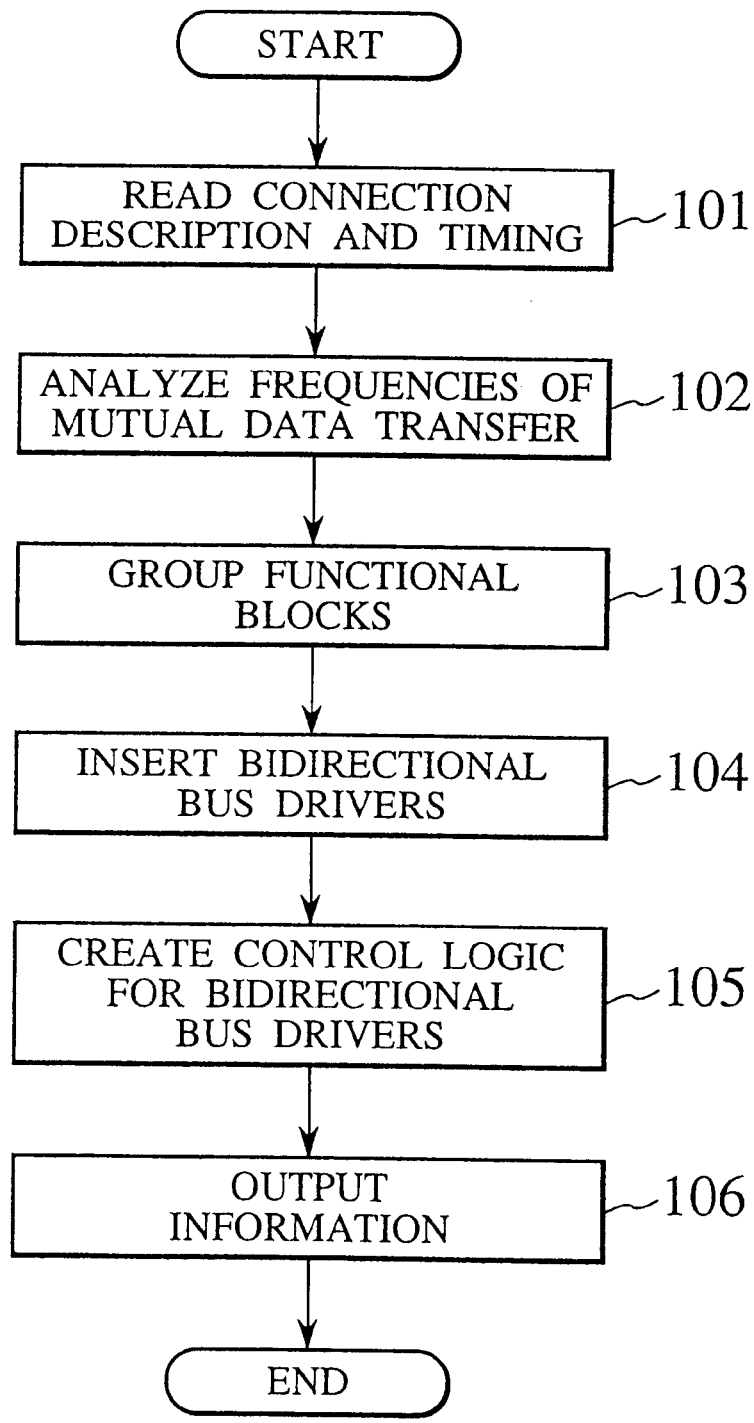
FIG. 8 is a flowchart showing the steps of composing the bus structure of any one of the first and second embodiments.
Figure 9:
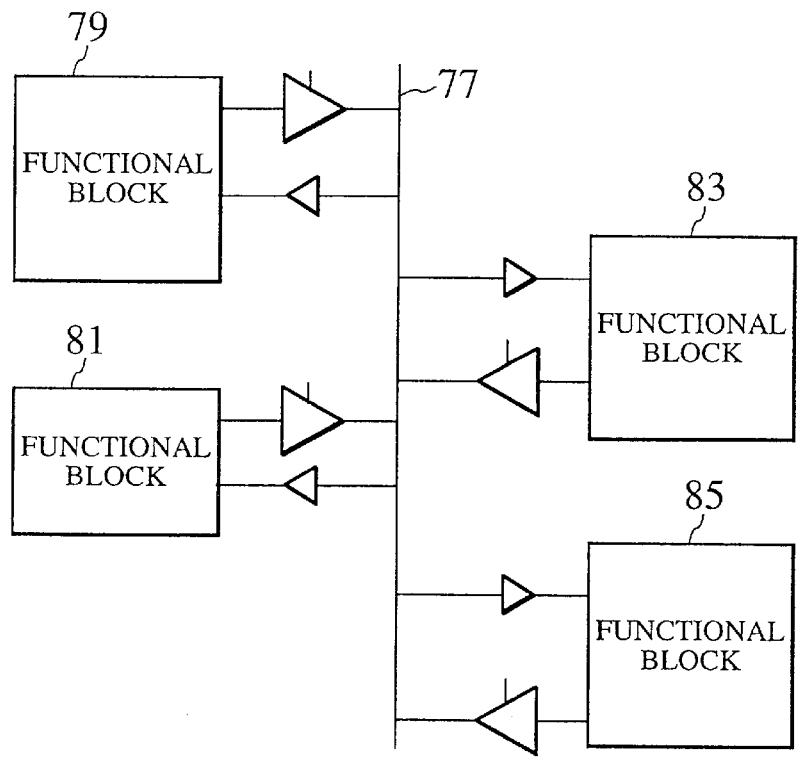
FIG. 9 shows a bus structure and functional blocks related to the flowchart of FIG. 8.

A method of composing the bus structure of any one of the first and second embodiments will be explained. FIG. 8 is a flowchart showing the steps of composing the bus structure. It is assumed in FIG. 9 that connections between a bus 77 and functional blocks 79, 81, 83, and 85 are provided in advance.

Step 101 reads connection description for the functional blocks 79, 81, 83, and 85 as well as timing constraints for data transfer among the functional blocks through the bus 77.

Figure 10:
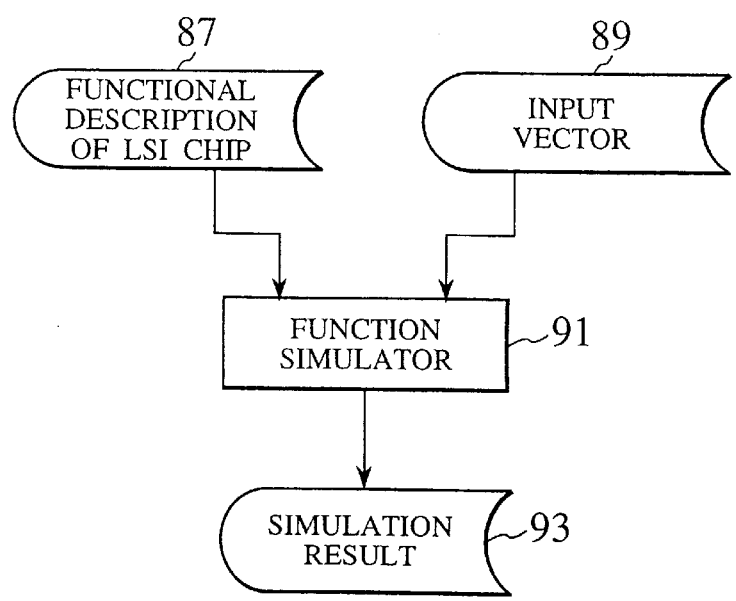
FIG. 10 shows an example of a transfer frequency analysis carried out in step 102 of FIG. 8.

Step 102 analyzes the frequencies of mutual data transfer to be made among the functional blocks through the bus 77. This analysis takes place, for example, as shown in FIG. 10. A function simulator 91 carries out a simulation according to functional description 87 of an LSI chip and an input vector 89 and provides a simulation result 93. The simulation result 93 is used for the analysis.

Figure 11:
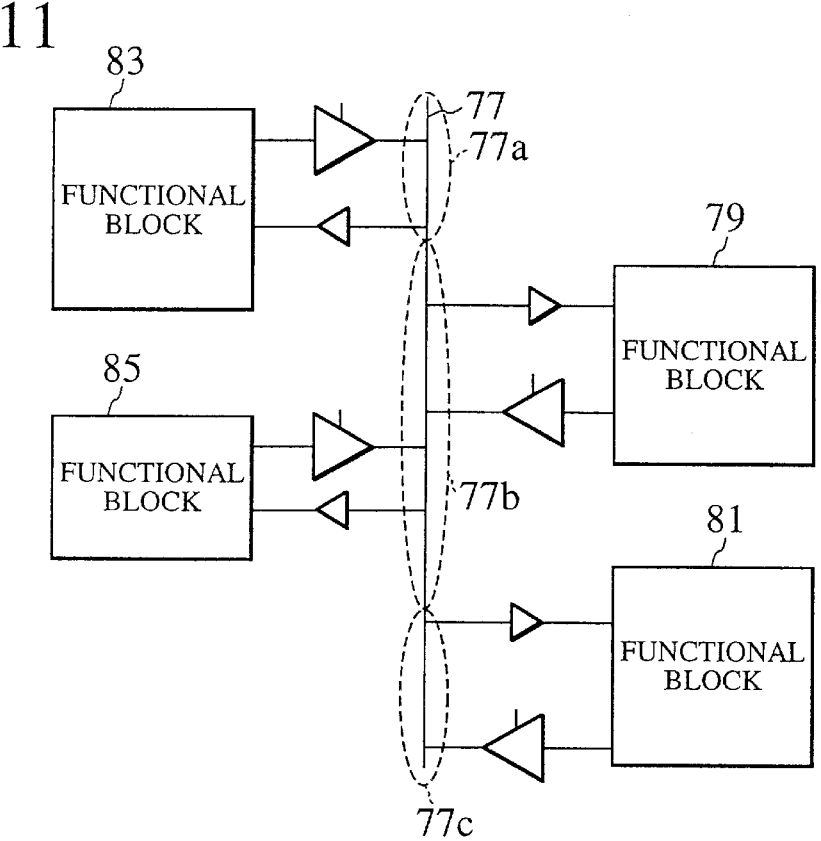
FIGS. 11 and 12 show techniques of composing the bus structure of any one of the first and second embodiments.

According to the data transfer frequency analysis of step 102, step 103 groups the functional blocks 79 to 85 so that functional blocks whose frequency of mutual data transfer is high are put in the same group. The bus 77 is divided into subsections, and the functional block groups are connected to the subsections, respectively. If the analysis of step 102 tells that the frequency of mutual data transfer between the functional blocks 79 and 85 is higher than the others, the functional blocks 79 and 85 are put in the same group, which is connected to the subsection 77b as shown in FIG. 11. The example of FIG. 11 divides the bus 77 into subsections 77a, 77b, and 77c and connects the functional block 81 to the subsection 77c and the functional block 83 to the subsection 77a. Although this example divides the bus 77 into three subsections, the gist of the present invention is to connect functional blocks (79 and 85 in FIG. 11) whose frequency of mutual data transfer is high to the same subsection of a bus. For example, the bus 77 may be divided into two subsections with the functional blocks 79 and 85 whose frequency of mutual data transfer is high being connected to one of the subsections and the functional blocks 81 and 83 to the other.

Figure 12:
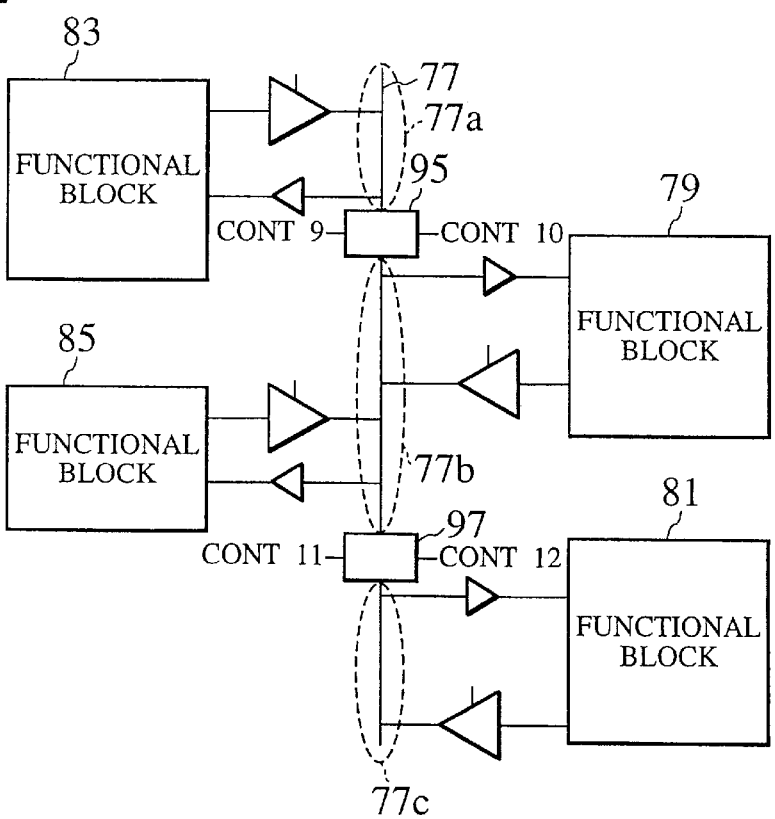

Step 104 inserts bidirectional bus drivers into boundaries between the subsections divided in step 103 and changes the connection description for the functional blocks read in step 101 so that the description may reflect the inserted bidirectional bus drivers. FIG. 12 shows an example of insertion of the bidirectional bus drivers. A bidirectional bus driver 95 is inserted between the subsections 77a and 77b, and a bidirectional bus driver 97 between the subsections 77b and 77c. The physical locations of the bidirectional bus drivers are determined by analyzing delay in transferring data between the functional blocks and by satisfying the timing constraints read in step 101. Namely, the bidirectional bus drivers 95 and 97 must be inserted to completely satisfy the timing constraints of data transfer among the functional blocks.

Step 105 creates control logic for the bidirectional bus drivers inserted in step 104. FIG. 13 is a table showing logic of control signals CONT9 to CONT13 for the bidirectional bus drivers 95 and 97. More precisely, the table shows active and inactive states of these control signals to transfer data between the functional blocks. For example, to transfer data from the functional block 79 to the functional block 85 both connected to the subsection 77b, the control signals CONT9 to CONT13 are all inactivated to electrically disconnect the subsection 77b from the subsections 77a and 77c. To transfer data from the functional block 83 connected to the subsection 77a to the functional block 81 connected to the subsection 77c, the control signal CONT9 for the bidirectional bus driver 95 and the control signal CONT11 for the bidirectional bus driver 97 are activated to electrically connect the subsections 77a to 77c in the direction from the functional block 83 toward the functional block 81.

The last step 106 outputs the connection description covering the bidirectional bus drivers inserted in step 104, information about the physical locations where the bidirectional bus drivers are inserted, and the control logic created in step 105 for the bidirectional bus drivers.

The above explanation limits the number of functional blocks to four for the sake of simplicity. In practice, the number of functional blocks is larger. Accordingly, the grouping of functional blocks is not as simple as mentioned above and is achievable in many ways. One example will be explained.

According to the analysis result provided by step 102, two functional blocks whose frequency of mutual data transfer is the highest are picked up to form a first group. Among the remaining functional blocks, functional blocks whose frequencies of mutual data transfer with respect to the first-group functional blocks are higher than a set level are selected. The selected functional blocks are put in the first group one by one in order of the frequencies of mutual data transfer. At this time, the number of functional blocks put in one group must be set in advance. If there is no such functional blocks qualified for the first group, or if the number of functional blocks in the first group reaches the limit, two functional blocks whose frequency of mutual data transfer is the second highest are picked up to form a second group. Among the remaining functional blocks, functional blocks whose frequencies of mutual data transfer with respect to the second-group functional blocks are higher than a set level are selected. The selected functional blocks are put in the second group one by one in order of the frequencies of mutual data transfer.

These processes are repeated until all of the functional blocks are grouped. The number of groups, however, must not be too large because it increases the number of bidirectional bus drivers to be inserted, to increase power consumption and elongate delay in data transfer speed due to internal resistance caused by the bidirectional bus drivers. Accordingly, the number of functional block groups must be determined to sufficiently reduce power consumption after grouping the functional groups, i.e., after dividing a bus into subsections and to secure given timing restraints for data transfer.

Figure 14:
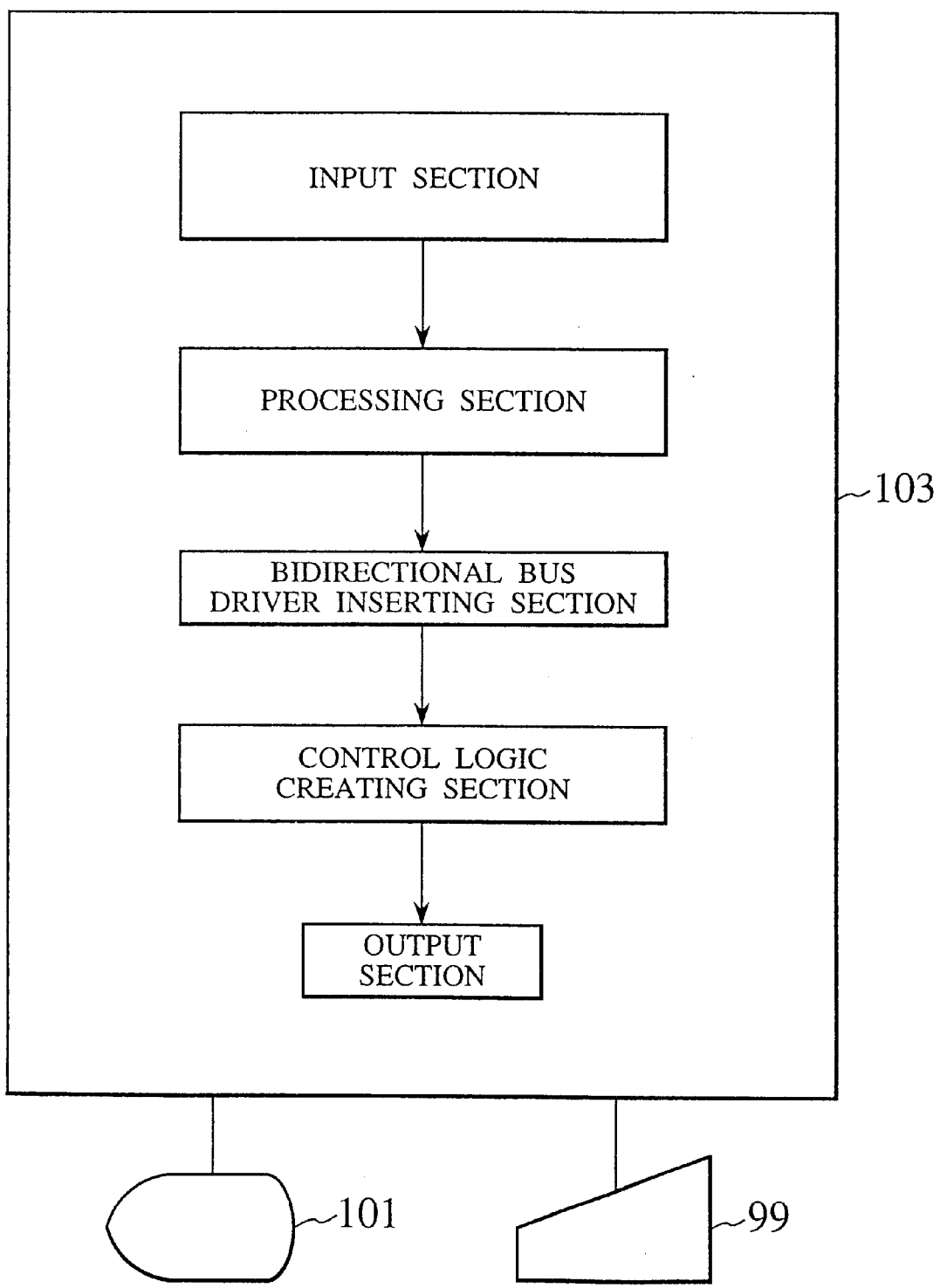
FIG. 14 shows a technique of composing the bus structure of any one of the first and second embodiments.

FIG. 14 shows a system for automatically composing control logic for the bus structure and bidirectional bus drivers of FIGS. 2 and 6 according to the steps of FIG. 8. This system may be realized by a standard computer system having a CPU for carrying out various operations, an input unit 99 such as a keyboard, mouse, light pen, and flexible disk drive, an external storage device (not shown) such as a memory device and disk drive, and an output unit 101 such as a display and printer. The CPU has operation units for carrying out various operations and a main memory for storing instructions for conducting the operations.

The system of FIG. 14 employs a software architecture having an input section for carrying out step 101 of FIG. 8, a processing section for carrying out steps 102 and 103, a bidirectional bus driver inserting section for carrying out step 104, a control logic creating section for carrying out step 105 for the inserted bidirectional bus drivers, and a processing section for carrying out step 106.

Figure 15:
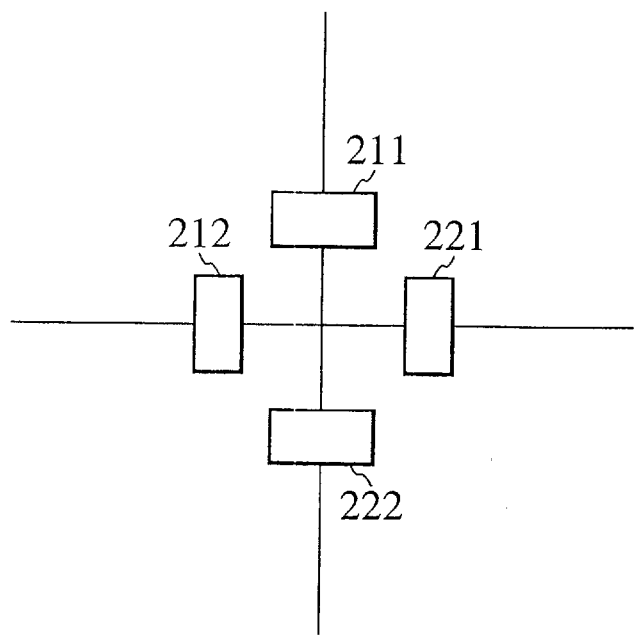
FIGS. 15 and 16 show bus structures according to modifications of the present invention.

FIG. 15 shows a bus structure according to a modification of the present invention. Buses cross each other and are divided into four subsections around an intersection of the buses. If the buses are on an orthogonal coordinate system, bidirectional bus drivers 221 and 212 are arranged on an X-axis beside the origin on positive and negative sides, respectively, and bidirectional bus drivers 211 and 222 are arranged on a Y-axis beside the origin on positive and negative sides, respectively. Circuit subsections that are present in the first quadrant are connected to a positive subsection of the X-axis or a positive subsection of the Y-axis. Circuit subsections that are present in the second quadrant are connected to a negative subsection of the X-axis or the positive subsection of the Y-axis. Circuit subsections that are present in the third quadrant are connected to the negative subsection of the X-axis or a negative subsection of the Y-axis. Circuit subsections that are present in the fourth quadrant are connected to the positive subsection of the X-axis or the negative subsection of the Y-axis.

When data is transferred with the use of only one of the subsections, the subsection in question is disconnected from the origin (a common node). Namely, the bidirectional bus driver to which the subsection in question is connected is inactivated. Then, the remaining three subsections that are irrelevant to the data transfer are disconnected from the data transfer, to reduce parasitic capacitance to a fourth of the prior art. For any data transfer between different subsections, only the subsections concerned are connected to the origin. Since there is only one data sender and one data receiver, the capacitance of the remaining two subsections are disconnected from the data transfer. Then, the parasitic capacitance of this data transfer will be half the prior art.

Figure 16:
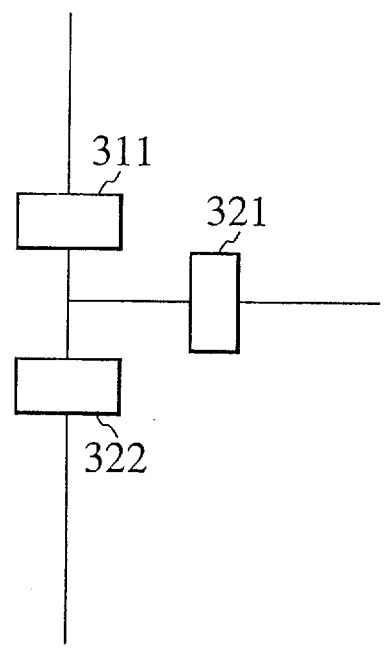

FIG. 16 shows a T-shaped bus according to a modification of the present invention. The effect of this modification is similar to that of FIG. 15. The bus is divided into three subsections by three bidirectional bus drivers 311, 321, and 322. Although the arrangements of FIGS. 2 and 16 divide each a bus into three subsections, the arrangement of FIG. 16 always disconnects a third of the bus from a data transfer operation when there are one sender and one receiver. Accordingly, the arrangement of FIG. 16 is more effective in reducing parasitic capacitance than the arrangement of FIG. 2.

In summary, the present invention divides a bus into subsections and transfers data between functional blocks whose frequency of mutual data transfer is high by electrically disconnecting the subsection to which the functional blocks in question are connected from the other subsections, thereby apparently reducing the parasitic capacitance of the bus. This results in greatly reducing power consumption compared with the prior art that charges and discharges the parasitic capacitance of the whole bus.

What is claimed is:

1. A semiconductor integrated circuit comprising:
   a bus divided into subsections;
   functional blocks for transferring data among themselves through the bus;
   connection circuit for connecting adjacent two of the subsections to each other in response to a control signal that indicates that data is to be transferred between the two subsections,
   wherein said connection circuit includes a pair of buffer circuits for switchingly transferring a signal from one of the adjacent subsections to the other adjacent subsection or vice versa; and
   means for grouping the functional blocks on the basis of the frequencies of mutual data transfer performed among said functional blocks such that a group of functional blocks whose frequency of mutual data transfer is high are connected to one of the subsections.

2. The semiconductor integrated circuit of claim 1, wherein those of the functional blocks whose frequency of mutual data transfer is high are connected to one of the subsections.

3. The semiconductor integrated circuit of claim 1, wherein the connection circuit is a bidirectional bus driver having:

first and second control input terminals controlled independently of each other; and first and second data input/output (I/O) terminals connected to the adjacent subsections, for inputting and outputting data, the bidirectional bus driver transferring data from the first data I/O terminal to the second data I/O terminal if the first control input terminal receives a first level and the second control input terminal a second level, and from the second data I/O terminal to the first data I/O terminal if the first control input terminal receives the second level and the second control input terminal the first level.

4. The semiconductor integrated circuit of claim 3, wherein the bidirectional bus driver has:

a first tri-state buffer circuit having an input terminal connected to the first data I/O terminal, an output terminal connected to the second data I/O terminal, and a control terminal connected to the first control input terminal; and a second tri-state buffer circuit cross-coupled with the first tri-state buffer circuit, having an output terminal connected to the first data I/O terminal, an input terminal connected to the second data I/O terminal, and a control terminal connected to the second control input terminal.

5. The semiconductor integrated circuit of claim 1, wherein the bidirectional bus driver is a transfer gate.

6. The semiconductor integrated circuit of claim 1, wherein the semiconductor integrated circuit is for portable information equipment.

7. The semiconductor integrated circuit of claim 1, wherein the number of the subsections is at least three, and each of the subsections is connected to a common node through a connection circuit.

8. The semiconductor integrated circuit of claim 1, wherein the bus comprises orthogonal bus lines divided into subsections in which two of the subsections transfer data between them by disconnecting the remaining subsections from the data transferring subsections.

9. A system for composing a bus structure of a semiconductor integrated circuit, the bus structure having a bus divided into subsections, each having a small capacitance, functional blocks for transferring data among themselves through the bus, and a connection circuit for connecting adjacent two of the subsections to each other and realizing mutual data transfer between them in response to a control signal, the system comprising:

means for reading connection description for the functional blocks and timing restraints for data transfer carried out between the functional blocks through the bus;

means for analyzing the frequencies of mutual data transfer made among the functional blocks through the bus, grouping the functional blocks on the basis of the frequencies such that the functional blocks with a high frequency of mutual data transfer are connected to the same group, and connecting the functional-block groups to the subsections, respectively;

means for inserting the connection circuit between adjacent ones of the subsections means for creating control logic for the connection circuits; and means for outputting connection description involving the inserted connection circuits, information for physical locations where the connection circuits are inserted, and the control logic for the connection circuits.

* * * * *